Feb. 13, 1962  F. S. KERR ETAL  3,021,449
AUTOMATIC HEADLIGHT SELECTOR
Filed Dec. 30, 1958  2 Sheets-Sheet 1
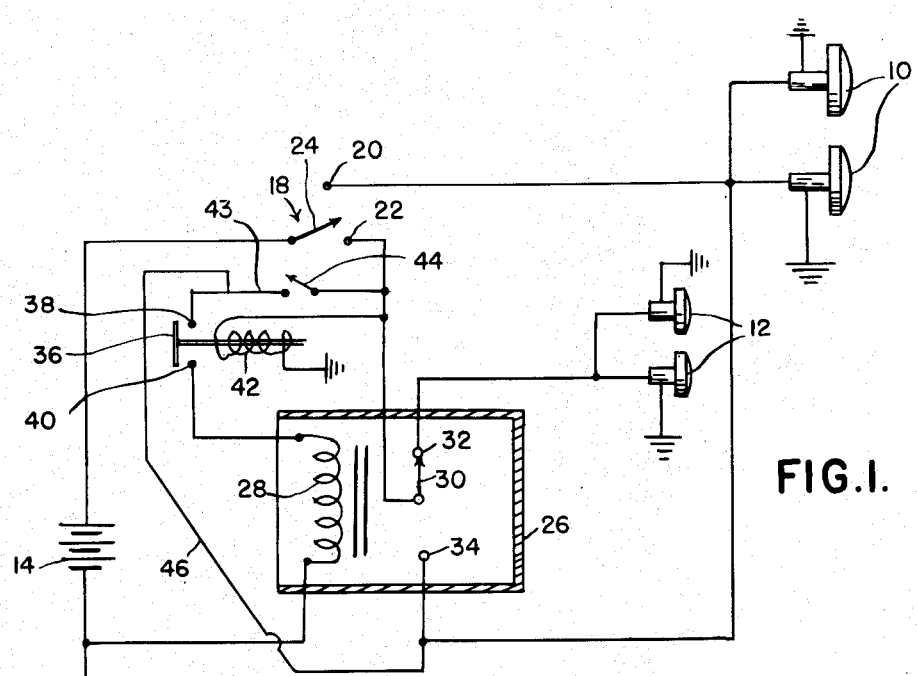
FIG.1.
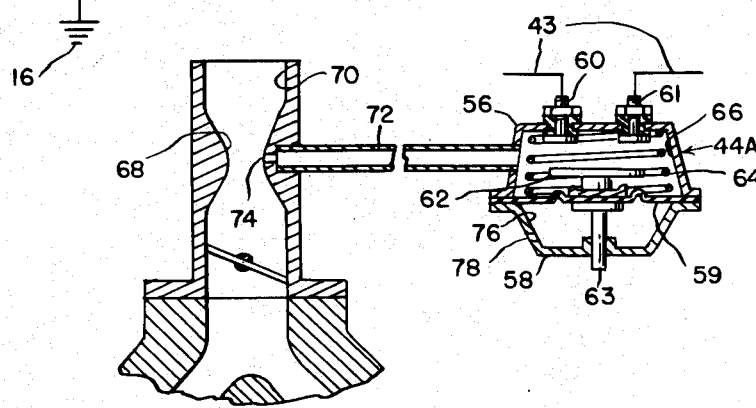
FIG.2.
FIG.3.
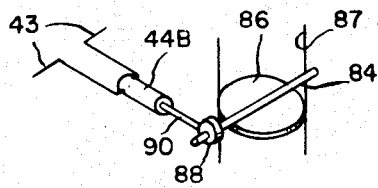
INVENTORS
FRED S. KERR
BY LON H. ROMANSKI
Whittemore,
Hulbert & Belknap
ATTORNEYS Feb. 13, 1962   F. S. KERR ETAL   3,021,449
AUTOMATIC HEADLIGHT SELECTOR
Filed Dec. 30, 1958   2 Sheets-Sheet 2

INVENTORS
FRED S. KERR
BY LON H. ROMANSKI

Whittemore,
Hulbert & Belknap
ATTORNEYS ns Patent Office 3,021,449
Patented Feb. 13, 1962

3,021,449
AUTOMATIC HEADLIGHT SELECTOR
Fred S. Kerr, Royal Oak, and Lon H. Romanski, Detroit, Mich., assignors to Holley Carburetor Company, Van Dyke, Mich., a corporation of Michigan
Filed Dec. 30, 1958, Ser. No. 783,885
16 Claims. (Cl. 315—79)

The present invention relates to an automatic headlight selector, and more particularly, to one adapted automatically to change from parking lights to headlights when the vehicle is driven away from the curb.

It is an object of the present invention to provide a control system for the lights of an automotive vehicle adapted to permit the operator to turn on the parking lights when the vehicle is parked and to shift automatically to the headlights or driving lights when the vehicle is driven away from the curb.

More specifically, it is an object of the present invention to provide a system as described in the preceding paragraph in which the headlights or driving lights, when once energized, remain on even though the vehicle is subsequently parked.

It is a feature of the present invention to provide a control circuit including the parking lights and headlights of an automotive vehicle including manually selectable means for energizing the parking lights and a control circuit including means responsive to a condition dependent on an engine driving condition different from curb idle condition effective to turn off the parking lights and turn on the headlights or driving lights.

It is a further feature of the present invention to provide in the control circuit described above, means effective to maintain the driving lights energized when the vehicle is subsequently parked or stopped.

Other objects and features of the invention will become apparent as the description proceeds, especially when taken in conjunction with the accompanying drawings, illustrating preferred embodiments of the invention, wherein:

FIGURE 1 is a diagrammatic view showing the vehicle lighting system and the control system therefor.

FIGURE 2 is a fragmentary view with parts in section showing a control switch suitable for use in the system of FIGURE 1.

FIGURE 3 is a diagrammatic view indicating yet another switch for use in the system.

Figure 4:
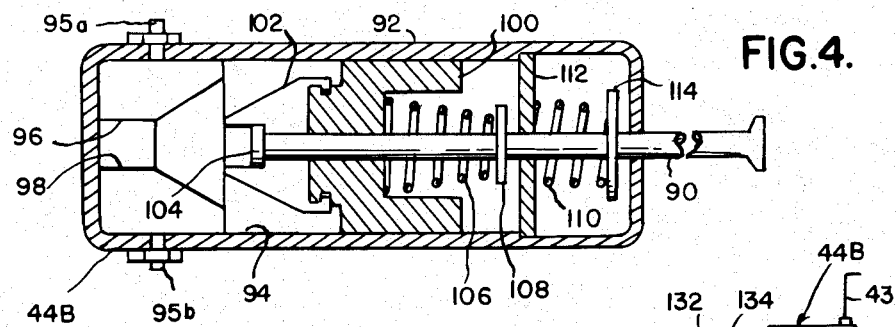
FIGURE 4 is an enlarged sectional view of the switch employed in the system shown in FIGURE 3.

The automatic headlight selector disclosed herein is basically a safety feature for automobiles. In many instances motorists drive about with their parking lights on when in reality they should have their headlights in use. The present invention will permit the use of parking lights only when the vehicle is standing still. Once the vehicle is in motion, the parking lights will automatically go off and the headlights will go on. A subsequent stopping will not cause a reversal; once the headlights go on it requires manual switching to again turn off the headlights and energize the parking lights. The control system for the lights is illustrated in FIGURE 1. In this figure the headlights of the motor vehicle are indicated at 10 and parking lights at 12. The lights are of course energized from the usual battery 14 grounded as indicated at 16, and including a single pole double throw manually operated selector switch 18 having a headlight contact 20 and a parking light contact 22.

When the switch arm 24 is moved upwardly from the illustrated position into contact with the headlight contact 20 the headlights are energized in the usual manner. However, the circuit for controlling the parking lights includes a relay indicated generally at 26 having a winding 28 and a movable switch arm 30, a headlight contact 34, and a parking light contact 32. When the relay 26 is not energized the switch arm 30 occupies the illustrated position in which it engages the parking light contact 32. When the relay 26 is energized the switch arm 30 moves into engagement with the headlight contact 34.

The coil or winding 28 of the relay 26 is controlled by a switch 36 adapted to bridge contacts 38 and 40 when a winding 42 is energized. The winding 42 is in series with the manual control switch 18 when its switch arm is in engagement with the parking light contact 22. Also in line 43, in series with the switch 36, is a condition responsive switch 44 which may take one of a number of forms as will later appear. However, in all cases, the switch 44 is responsive to a vehicle condition other than parking or curb idle. Thus, the switch 44 will be opened when the vehicle is parked and will remain open even if the engine is started but is allowed to run under curb idle conditions. In any case, when the vehicle is driven away from the curb the switch 44 closes.

With the vehicle standing at the curb the operator may shift the switch arm 24 into engagement with the parking light contact 22, thus establishing a circuit through the relay switch arm 30 and parking light contact 32 to the parking lights. At the same time, a circuit is completed through the solenoid or winding 42, thus closing the contact 36 which will remain closed so long as the switch arm 24 remains in engagement with the contact 22. However, at this time the circuit is not completed through the relay 26 because the condition responsive switch 44 remains open.

When the vehicle is driven away from the curb the switch 44 closes thus completing a circuit through the winding 28 of the relay 26, which in turn shifts the movable switch arm 30 away from the parking light contact 32 and into engagement with the driving lights contact 34. This of course turns off the parking lights and energizes the driving lights. At the same time, a holding circuit bypassing the condition responsive switch 44 is established through a by-pass from battery 14, switches 24 and 30, headlight contact 34, line 46, switch 36 bridging contacts 38 and 40, coil 28 and ground 16. Accordingly, even though the condition responsive switch 44 is subsequently opened, as for example for stopping or parking the vehicle, the headlights will remain energized. If the operator wishes at such time to turn off the headlights and re-energize the parking lights, it is necessary for him to shift the manual switch arm 24 out of engagement with the contact 22 momentarily and then to re-engage the arm with the contact.

Referring now to FIGURE 2 there is shown a condition responsive switch here designated 44A. This switch comprises outer housing members 56 and 58 between which a flexible diaphragm 59 is peripherally clamped. The switch is connected in the line 43 as illustrated, end portions of the line being connected to terminals 60 and 61. A bridging electrical conductor 62 is fastened to the central portion of the diaphragm 59 and is insulated therefrom. The diaphragm is made of conductive material. The bridging member 62 is adapted to span the inner portions of the terminals 60 and 61 when the diaphragm moves upwardly from the position illustrated in FIGURE 2. Also connected centrally of the diaphragm 59 is a guide pin 63 extending through the guide opening in the housing portion 58. A compression spring 64 is received in the chamber 66 formed between the upper housing portion 56 and the diaphragm 59 and operates to bias the diaphragm downwardly as seen in FIGURE 2. The interior of the chamber 66 is connected to a source of vacuum such for example as the throat of a venturi 68 in an air or fuel induction passage 70. The connection is shown as constituted by a conduit 72 having a restricted port 74 located in the venturi. The chamber 76 formed between the diaphragm 59 and the housing portion 58 communicates to atmosphere through a port 78. The strength of the spring 64 is selected such that the conducting member 62 bridges the terminals 60 and 61 whenever the engine of the vehicle is operating at a speed above curb idle. Conversely, the switch 44A will remain open when the engine of the vehicle is not operating or when operating only at curb idle.

Referring now to FIGURE 3 there is illustrated another form of condition responsive switch, the switch in this figure being designated 44B. Again, the switch is shown as located in the line 43. The switch 44B is located directly adjacent a throttle shaft 84 which carries the throttle plate 86 controlling flow of fuel through the induction passage 87 to the engine of the automotive vehicle. Fixedly mounted on the throttle shaft 84 is a cam 88. The switch 44B includes an external switch actuating plunger 90 in juxtaposition to the cam 88. The cam is shaped so that when the throttle is in fully closed or idling position, the plunger is allowed to move outwardly by means subsequently to be described, to a position in which the circuit between its terminals is broken. However, when the throttle is moved a predetermined smaller distance away from closed or substantially closed position the plunger is cammed inwardly and the circuit is closed between its terminals.

Referring now to FIGURE 4 there are illustrated details of the switch 44B. As seen in this figure, the switch comprises a housing 92 formed of a suitable insulating material having a generally cylindrical cavity 94 therein. Adjacent one end of the housing are fastened terminals 95a and 95b which at the interior of the housing have electrical contact portions 96 and 98 respectively connected to them. A piston 100 is slidably received within the cylinder and has an electrical bridging conductor 102 fixed to one end thereof. The plunger 90, previously referred to, is formed of insulating material and extends through the piston 100 and has a retaining head 104 engaging against a suitably shaped seat on the conductor 102. The arrangement is such that after the bridging conductor 102 has engaged contacts 96 and 98, further inward movement of the plunger 90 is permitted without straining the parts. A spring 106 surrounds an intermediate portion of the plunger 90 and engages at opposite ends between the piston 100 and a spring retaining collar 108 fixed to the plunger or shaft 90. A second spring 110 surrounds the plunger 90 and engages between a stationary spring abutment 112 and a second collar 114 fixed to the shaft or plunger. It will be observed that under the influence of the springs, the bridging contact 102 remains in open circuit position except when forced inwardly by inward movement of the plunger 90.

Figure 5:
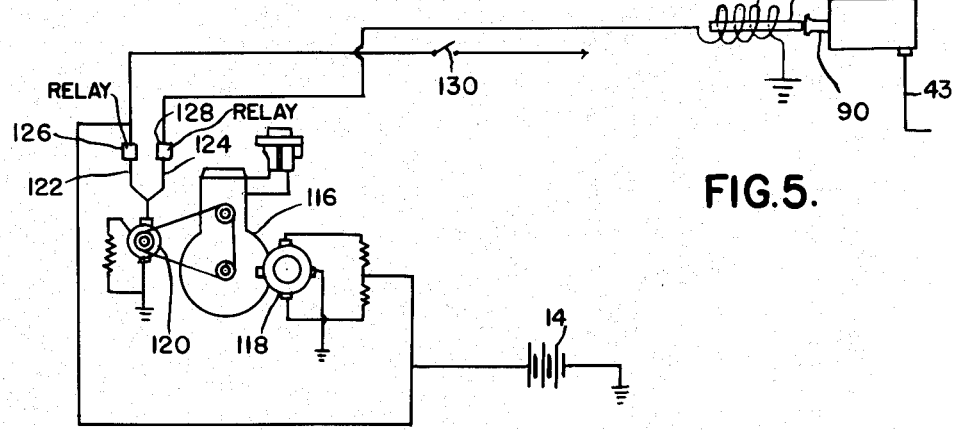
FIGURE 5 is a schematic illustration of yet another control switch and associated mechanism.

Referring now to FIGURE 5 there is illustrated another embodiment of the invention which differs from the embodiment previously described primarily in the vacuum switch 44A and the throttle cam switch 44B. In this embodiment of the invention, the automobile engine 116 is provided with the usual electric starter motor 118 connected to the battery 14. A generator 120 is connected to the engine to be driven thereby. The generator is grounded and has output lines 122 and 124 having relays 126 and 128 therein. The relay 126 is of the type which prevents current flowing from the battery to the generator. The line 122 leads to the ignition circuit through the ignition switch indicated at 130. The relay 128 in the line 124 is adapted to close at a lower voltage than that which is required to close the relay 126. For example, the relays may be selected such that at 450 r.p.m. of the engine neither of the relays 126 or 128 would be closed. The relay 128 may be designed to close at the voltage corresponding approximately to 500 engine r.p.m. and at and above this engine speed the line 124 will permit the flow of current from the generator to the winding 132 of a solenoid including a plunger 134 adapted to engage the plunger 90 of the switch 44B. Accordingly, when the engine speed is above a speed corresponding to curb idle operation, the switch 44B may be closed to shift the current from the parking lights to the headlights.

Figure 6:
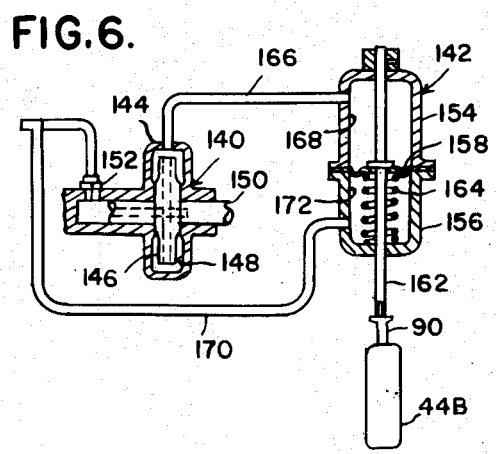
FIGURE 6 is a sectional view of a fuel pump and pressure sensitive switch actuator and switch employed in another embodiment of the present invention.

Another embodiment of the invention is illustrated in FIGURE 6. In the embodiment of the invention employing the condition responsive switch 44A the invention was described in conjunction with an internal combustion engine of the type employing a carburetor for supplying fuel mixture to the engine. In the embodiment of the invention described in conjunction with the condition responsive switch 44B the invention was described in conjunction with any type of engine and the specific condition controlling the switch was engine speed.

In the embodiment of the invention illustrated in FIGURE 6 there is illustrated the application of the invention to a system employing a pump 140 of the type which may be used in either a pressure fuel system or a fuel injection system, in conjunction with a pressure responsive switch actuator 142 adapted to communicate with the respective pressures available at both sides of the pump 140.

The pump 140 is substantially comprised of a housing 144 containing an impeller 146 in a chamber 148, an impeller shaft 150 which is driven at a speed having a constant ratio to that of the engine, and a fuel inlet port 152. The pressure responsive switch actuator 142 comprises housing members 154 and 156 between which a flexible diaphragm 158 is accurately held. The shaft 162 is fastened to the diaphragm 158 and pilots in housing members 154 and 156 respectively. A spring 164 surrounds the shaft 162 and extends between the diaphragm 158 and the inner end of the housing portion 156 in such a manner as to normally bias the diaphragm and shaft 162 upwardly, as seen in FIGURE 6. A conduit 166 is provided which connects the pressure chamber 148 of the pump to chamber 168 of the switch actuator 142 while a conduit 170 transmits the pressure of the field supplied to the pump 140 to the chamber 172 of the switch actuator.

The outer end of the rod or shaft 162 is located adjacent the plunger 90 of the switch 44B and when the pressure differential in the chambers 172 and 168 is sufficiently great, the contacts of the switch 44B will be closed. The system is thus basically responsive to speed of rotation of the shaft 150 and the components are designed so that the contacts of switch 44B remain open when the engine is stopped or operating at a speed which is not above curb idle.

Briefly reviewing the foregoing, it will be seen that the light control system includes a condition responsive switch effective to permit the operator of the vehicle to activate the parking lights only when the vehicle is stationary. When the engine is running at any speed above curb idle speed, the control system turns off the parking lights and turns on the headlights. The headlights remain on until the operator of the vehicle manually turns off the headlights. In other words, parking the vehicle or stopping the motor will not automatically turn off the headlights and again turn on the parking lights.

The drawings and the foregoing specification constitute a description of the improved automatic headlight selector in such full, clear, concise and exact terms as to enable any person skilled in the art to practice the invention, the scope of which is indicated by the appended claims.

What we claim as our invention is:

1. A control system for vehicle lights, the vehicle having an internal combustion engine, said system including headlights and parking lights, a circuit including a manual switch for selectively energizing said lights, said circuit including a relay effective when energized to break the circuit to said parking lights and to establish a circuit to said headlights, and a control switch in series with said relay responsive to an engine vacuum condition and effective when said engine vacuum is above parking speed to energize said relay.

2. A control system for vehicle lights, the vehicle having an internal combustion engine, said system including headlights and parking lights, a circuit including a manual switch for selectively energizing said lights, said circuit including a relay effective when energized to break the circuit to said parking lights and to establish a circuit to said headlights, and a control switch in series with said relay responsive to an engine vacuum condition and effective when said engine vacuum is above parking speed to energize said relay, said circuit including a holding circuit to said relay closed on initial energization of said relay and effective to maintain said relay energized despite opening of said control switch.

3. A vehicle lighting system for a vehicle having an internal combustion engine, said system including headlights and parking lights, a manual selector switch for selectively energizing said headlights and parking lights, and control means operated by initiation of vehicle movement as determined by engine energization to turn off said parking lights, if energized, and energizing said headlights, said control means including means to prevent automatic turning off of said headlights and re-energization of said parking lights by stoppage of said vehicle with the engine energized or de-energized.

4. A vehicle lighting system for a vehicle having an internal combustion engine, said system including headlights and parking lights, a manual selector switch for selectively energizing said headlights and parking lights, and control means operated by initiation of vehicle movement as determined by engine energization to turn off said parking lights, if energized, and energizing said headlights and to maintain said headlights energized and said parking lights off upon subsequent stoppage of said vehicle with the engine energized or de-energized.

5. A lighting system for a motor vehicle having an internal combustion engine provided with a source of engine affected vacuum, said system including headlights and parking lights, a manual selector switch for selectively energizing said headlights and parking lights, and control means operated by initiation of vehicle movement as determined by said engine to turn off said parking lights, if energized, and energizing said headlights and to maintain said headlights energized and said parking lights off upon subsequent stoppage of said vehicle with the engine energized or de-energized, said control means being responsive to the said engine affected vacuum.

6. A lighting system for a motor vehicle having an internal combustion engine provided with an intake passage having a venturi for producing a vacuum, said system including headlights and parking lights, a manual selector switch for selectively energizing said headlights and parking lights, and control means operated by said venturi vacuum to turn off said parking lights, if energized, and energizing said headlights and to maintain said headlights energized and said parking lights off upon subsequent stoppage of said vehicle with the engine energized or de-energized, said control means being responsive to the venturi vacuum from said engine.

7. A lighting system, for a motor vehicle having an internal combustion engine provided with a throttle, said system including headlights and parking lights, a manual selector switch for selectively energizing said headlights and parking lights, control means operated by initiation of vehicle movement as determined by said throttle to turn off said parking lights, if energized, and energizing said headlights and to maintain said headlights energized and said parking lights off upon subsequent return of said throttle, said control means comprising a switch, and means for actuating said switch in accordance with the position of said throttle.

8. A lighting system for a motor vehicle having an internal combustion engine provided with a pump operated at a speed dependent on engine speed to establish a pressure differential dependent on engine speed, said system including headlights and parking lights, a manual selector switch for selectively energizing said headlights and parking lights, and control means operated by initiation of vehicle movement as determined by engine energization to turn off said parking lights, if energized, and energizing said headlights and to maintain said headlights energized and said parking lights off upon subsequent stoppage of said vehicle with the engine energized or de-energized, said control means comprising means responsive to said pressure differential.

9. A lighting system for a motor vehicle having an internal combustion engine provided with a source of engine affected vacuum, said system including headlights and parking lights, a manual selector switch for selectively energizing said headlights and parking lights, control means operated by initiation of vehicle movement as determined by engine energization to turn off said parking lights, if energized, and energizing said headlights, said control means including a circuit having a relay therein effective to turn off said parking lights and energize said headlights, and a switch controlling said relay, and switch control means responsive to the said engine affected vacuum.

10. A lighting system for a motor vehicle having an internal combustion engine provided with an intake passage having a venturi for producing a vacuum, said system including headlights and parking lights, a manual selector switch for selectively energizing said headlights and parking lights, control means operated by initiation of vehicle movement as determined by engine energization to turn off said parking lights, if energized, and energizing said headlights, said control means including a circuit having a relay therein effective to turn off said parking lights and energize said headlights, and a switch controlling said relay, and switch control means responsive to said venturi vacuum.

11. A lighting system for a motor vehicle having an internal combustion engine provided with a pump operated at a speed dependent on engine speed to establish a pressure differential dependent on engine speed, said system including headlights and parking lights, a manual selector switch for selectively energizing said headlights and parking lights, control means operated by initiation of vehicle movement as determined by engine energization to turn off said parking lights, if energized, and energize said headlights, said control means including a circuit having a relay therein effective to turn off said parking lights and energize said headlights, and a switch controlling said relay, and switch control means responsive to said pressure differential.

12. A lighting system for a motor vehicle having an internal combustion engine provided with a source of engine affected vacuum, said system including headlights and parking lights, a manual selector switch for selectively energizing said headlights and parking lights, control means operated by initiation of vehicle movement as determined by engine energization to turn off said parking lights, if energized, and energizing said headlights, said control means including a circuit having a relay therein effective to turn off said parking lights and energize said headlights, a switch controlling said relay, and switch control means responsive to the said engine affected vacuum, said circuit including a holding circuit to said relay closed on initial energization of said relay and effective to maintain said relay energized despite opening of said switch control means.

13. A lighting system for a motor vehicle having an internal combustion engine provided with an intake passage having a venturi for producing a vacuum, said system including headlights and parking lights, a manual selector switch for selectively energizing said headlights and parking lights, control means operated by initiation of vehicle movement as determined by engine energization to turn off said parking lights, if energized, and energizing said headlights, said control means including a circuit having a relay therein effective to turn off said parking lights and energize said headlights, a switch controlling said relay; and switch control means responsive to venturi vacuum, said circuit including a holding circuit to said relay closed on initial energization of said relay and effective to maintain said relay energized despite opening of said switch control means.

14. A light control system for a vehicle comprising in combination an engine, a source of electrical energy, a headlight, a parking light, a circuit having a manual switch for selectively energizing said lights, said circuit including a relay effective when energized to break the circuit to said parking light and to establish the circuit to said headlight, and cotnrol means in series with said relay operated by initiation of vehicle movement as determined by engine energization to turn off said parking light, if energized, and energize said headlight, said control means including means to prevent automatic turning off of said headlight and re-energization of said parking light by stoppage of said vehicle with the engine energized or de-energized.

15. A vehicle lighting system for a vehicle having an internal combustion engine, said system including a headlight and a parking light, a circuit including a manual selector switch for selectively energizing said headlight and parking light, a relay in said circuit effective when energized to break the circuit to said parking light and to establish the circuit to said headlight, an electrically responsive switch in series with said manual switch when said parking light is energized, and a condition responsive switch in series with said electrically responsive switch and effective to energize the relay and break the circuit to said parking light and to establish a circuit to said headlight, said condition responsive switch being responsive to engine operation above parking speed.

16. A vehicle lighting system for a vehicle having an internal combustion engine, said system including a headlight and a parking light, a circuit including a manual selector switch for selectively energizing said headlight and parking light, a relay in said circuit effective when energized to break the circuit to said parking light and to establish the circuit to said headlight, an electrically responsive switch in series with said manual switch when said parking light is energized, a condition responsive switch in series with said electrically responsive switch and effective to energize the relay and break the circuit to said parking light and to establish a circuit to said headlight, said condition responsive switch being responsive to an engine operation above parking speed, and means for preventing automatic turning off of said headlight and re-energization of said parking light by the stoppage of said vehicle with the engine energized or de-energized.

References Cited in the file of this patent

UNITED STATES PATENTS

| | | |
|---|---|---|
| 1,951,495 | Trafton | Mar. 20, 1934 |
| 2,045,274 | Kundig | June 23, 1936 |
| 2,751,522 | Spangenberg | June 19, 1956 |